Feb. 25, 1969     W. J. SHATAS ET AL     3,430,170
MAGNETIC FLAG
Filed Feb. 24, 1967
FIG. 1
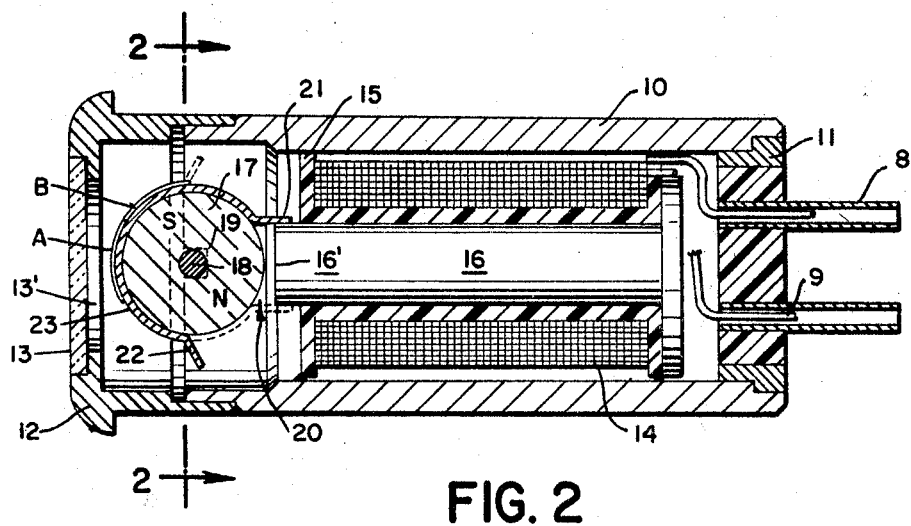
FIG. 2
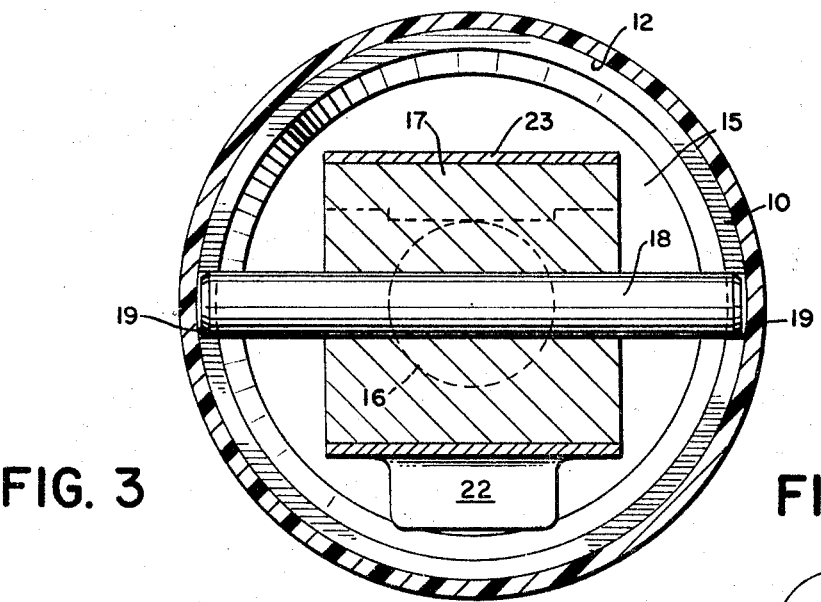
FIG. 3
FIG. 3A
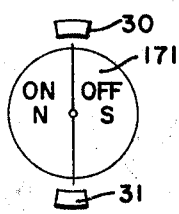
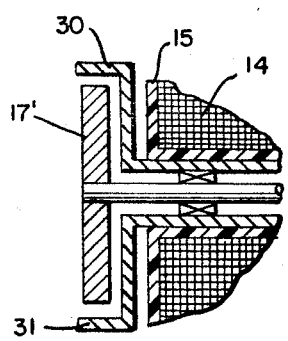
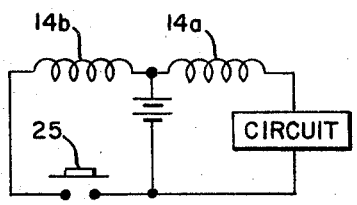
FIG. 4
INVENTORS
WILLIAM J. SHATAS
STANLEY SMITH
BY *Mandeville & Schweitzer*
ATTORNEYS

United States Patent Office 3,430,170
Patented Feb. 25, 1969

3,430,170
MAGNETIC FLAG
William J. Shatas, Middlebury, and Stanley Smith, Roxbury, Conn., assignors to Middlebury Manufacturing Co., Inc., Waterbury, Conn., a corporation of Connecticut
Filed Feb. 24, 1967, Ser. No. 618,534
U.S. Cl. 335—234           7 Claims
Int. Cl. H01f 7/00, 7/02

ABSTRACT OF THE DISCLOSURE

A bistable fault indicator including a permanently magnetized rotor which is self-biasing into a first position; a reset-test coil of predetermined strength and polarity, when selectively energized, to displace the rotor into a second position; a monitoring coil, adapted to be continuously energized and when energized having a predetermined strength and polarity sufficient to maintain the rotor, previously displaced, in the second position, but having insufficient strength to overcome the permanent magnetic bias and to displace said rotor from the first to the second position; and a non-magnetic, index-bearing clip associated with the rotor for calibrating and limiting the travel of the same.

Background and summary of the invention

Electromagnetic fault indicators are well known to the art as devices which provide a warning, visual or otherwise, that a circuit has been interrupted. The vast majority of these devices have been of the monostable type, that is to say, the fault indication is automatically removed upon the elimination or correction of a fault. While monostable fault indication is acceptable for some applications, an indicator with a "memory," one which indicates that a circuit interruption has occurred even if the interruption was momentary, is often desirable. For example, in a control panel such as found in aircraft, which includes monitoring indicators for many vital systems, it is important to know that a fault or circuit interruption has occurred, even if the fault is of the self-correcting type. Of course, with monostable indicators, potentially seriously dangerous momentary, self-correcting faults and the like would ordinarily not be noted by the observer who periodically scanned the control panel.

The art has produced bistable fault indicators for clocks, which indicators are automatically, mechanically reset when the clock, itself, is reset after a power interruption. However, such devices are generally unreliable when used in environments where mechanical vibration may be present, such as in control systems for aircraft. The present invention provides a new and improved bistable fault indicator which is electromagnetically resettable and which enables an operator to test remotely a monitored circuit to establish whether or not an indicated fault has been corrected.

The electromagnetic fault indicator of the present invention, a so-called magnetic flag, is a highly miniaturized, bistable indicator including a permanently magnetized rotor which is adapted to home to a first or "off" equilibrium position under permanent magnetic influence; a reset-test coil of predetermined polarity and strength, when energized, sufficient to displace the rotor against the permanent biasing into a second or "on" position; and a low resistance latch coil of predetermined polarity and limited strength, when energized, insufficient to displace the rotor from the first to the second position but sufficient to maintain a previously displaced rotor in the second position. As will be understood, the latch coil is adapted to be connected in series with a circuit or element to be monitored for faults, while the reset-test coil is adapted to be independently connected for selective energization to determine the state of the circuit to be monitored, i.e., upon de-energization of the reset-test coil, the non-return of the rotor to its first position will indicate the absence of or the correction of a fault, whereas the return of the rotor to its first position will indicate the existence of a fault.

For a more complete understanding of the present invention, reference may be had to the following detailed description taken in conjunction with the accompanying drawings in which:

FIG. 1 is an enlarged, longitudinal, cross-sectional view of a new and improved magnetized fault indicator embodying the principles of the present invention;

FIG. 2 is a further enlarged, cross-sectional view of the fault indicator shown in FIG. 1, taken along line 2—2;

FIGS. 3 and 3a are schematic representations of an alternate rotor arrangement embodying the inventive principles; and FIG. 4 is a schematic wiring diagram showing the coil arrangement.

The fault indicator of the present invention is contained in a miniaturized tubular cylindrical housing 10 which is closed at one end by a header 11 and at the other end by a flanged cap 12 having a masked glass window 13 therein. In a typical preferred embodiment, the overall length of the housing is approximately 1.06 inches while the outer diameter is approximately .456 inch. The housing 10 is fabricated of magnetic material while the header 11 and cap 12 are of a non-magnetic material.

Within the housing 10 a common plastic spool 15 supports a center tapped, double wound coil 14 comprised of a latch coil 14a having 10,000 turns of No. 49 gauge insulated wire and a "reset-test" coil 14b comprised of 300 turns of No. 42 gauge insulated wire. The lead 9 of the center tapped, double wound coil 14 (only two of which are shown in FIG. 2) extend through conduits 8 in the header 11 for appropriate connection to external circuitry shown schematically in FIG. 4. The coils 14a, 14b are wound in the same direction and generally surround a flanged, tubular core 16 of iron or like magnetic material disposed within the bore of the spool 15.

A permanently magnetized, disc-like rotor 17 is supported for rotation on a pin 18 extending transversely of the forwardmost end of the housing and disposed in opposed bearing notches 19 formed therein. As will be appreciated, a non-uniform flux gap 20 exits between the circumferential portions of the rotor 17 and the free end portions 16' of the iron core 16.

As an important specific aspect of the invention, an index-bearing, C-shaped clip 23 having a pair of outwardly extending stop arms 21, 22 formed of suitable non-magnetic material is placed loosely over the rotor 17 in a manner accommodating independent rotation of the rotor. When the rotor assumes an equilibrium position (designated hereinafter as its first or "off" position) by virtue of the attraction of the permanently magnetized rotor for the core 16, the clip is permanently secured to the rotor by adhesive or the like with a first index A (i.e., the word "off" or a distinctive color) visible in the window opening 13'. As will be understood, the clip carries a second index B (i.e., the word "on" or a second color) which is visible through the window in the second position of the rotor.

The stop arms 21 and 22 are adapted to engage opposite outer surfaces of the core 16, as shown in FIG. 1, to limit the rotary displacement thereof to approximately 60° and prevent "overshooting" of the rotor beyond said first and second positions. Ideally, in the preferred operation of the new mechanism, the rotor will be magnetically or electromagnetically latched in positions in which the arms are adjacent to but not contacting the core. Thus, the clip 23 serves two purposes, the custom calibration of the mechanism during assembly, a necessity since the permanently magnetic properties of individual rotors cannot be effectively maintained uniform from rotor to rotor and the prevention of "overshooting" of the rotor beyond its "on" and "off" latched positions while in service.

As will be understood, the instantaneous positioning of the rotor is determined by one or a combination of three separate forces; namely, the permanent magnetic forces of the rotor 17, itself, the electromagnetic forces of the latch coil 14a, and the electromagnetic forces of the reset-test coil 14b. Thus, the arrangement of the rotor 17, the coils 14a, 14b, and the calibration clip 23 is such that the rotor 17 will assume its first position generally as shown in FIG. 1, with the arm 21 adjacent the upper core surface (as viewed in FIG. 1) when both the reset-test and the latch coils are de-energized. This is the magnetic latch or "off" position in which the first index A is visible through the window 13.

In accordance with the inventive principles, the strength of the electromagnetic force developed by the energization of the latch coil 14a is insufficient to overcome the magnetic latching effected by the self-biasing forces of the permanent magnetic rotor 17; however, the energization of the reset-test coil 14b provides sufficient electromagnetic force to overcome the permanent magnetic latching and to urge the rotor 17 counter-clockwise (as viewed in FIG. 1) into an active position in which the arm 22 is adjacent the lower surface of the core 16, as shown in phantom in FIG. 1. The electromagnetic force developed by the energization of the latch coil 14a is sufficient to retain the rotor in its active position without the energization of the reset-test coil, although said forces are insufficient by themselves to overcome the permanent magnetic latching when the rotor is in its inactive position.

In service, the device of the invention is simply operated by connecting the latch coil 14a in series with the circuit to be monitored and a D.C. source while connecting the reset-test coil 14b in series with a pushbutton switch 25 with normally open contacts and a D.C. source, as shown in FIG. 4. As an important feature of the invention, the latch coil, which is adapted to be continuously energized, consumes very little current. For example, when the above-described latch coil is energized by a source of 24 volts D.C., the current thereacross is extremely low, i.e., approximately 10 milliamps. Assuming the circuit to be monitored is complete and the latch coil 14a is energized, the rotor will be in the position indicated in FIG. 1, since the strength of the latch coil is insufficient to overcome the permanent magnetic latching. However, upon the momentary energization of the reset-test coil 14b by depressing the pushbutton switch 25, its electromagnetic effect will be sufficient to overcome the permanent magnetic latch and to rotate the rotor counterclockwise into the second position shown in phantom in FIG. 1, to expose the "on" index B in the window frame 13'. Subsequent de-energization of the reset-test coil will not change the position of the rotor 17 while the latch coil remains energized, since the strength of the energized latch coil is sufficient to hold the displaced rotor in the "on" position.

If during the course of the operation of the monitored circuit a fault should develop and the circuit be opened for any reason causing the de-energization of the latch coil, the rotor will be immediately returned under the permanent magnetic influence to its inactive position causing a fault indication, i.e., the display of "off" in the window frame. In accordance with the invention, correction of the fault will not cause the fault indication to be changed, since the strength of the energized latch coil acting alone is insufficient to overcome the permanent magnetic latching (although it is, indeed, sufficient to maintain the rotor in an active position after the rotor has been displaced from the active position).

Accordingly, when an operator observes a fault indication, he will be able to permanently reset the indicator by energizing the reset coil only, if the fault has been corrected. That is to say, if after energizing and de-energizing the reset coil (depressing and releasing switch 25) the rotor 17 has assumed an "on" position, then the indicated fault has been corrected. On the other hand, if the rotor does not remain in the "on" position after the energization and de-energization of the "reset" coil, then the fault is still present. Thus, it will be appreciated that should the fault have been of a momentary or self-correcting nature, its existence will have been "recorded" by the change in position of the rotor, which will be visible through the window 13.

In some cases it may be desirable to operate the indicator with a rotor 17' which rotates about the axis of the housing, as shown schematically in FIGS. 3 and 3a. With this modified arrangement, the "on"-"off" indices are marked directly on the face of the rotor 17' and the core is formed having two axially extending pole pieces 30, 31, as shown.

In the alternative embodiment, the operation is substantially the same as in the preferred embodiment. That is to say, the rotor 17' assumes a first, latched position due to its self-biasing, permanent magnetism, and the rotor may be displaced into a second position by energization of the reset-test coil 14b. As in the above-described preferred embodiment of FIG. 1, the latch coil 14a is strong enough when energized to maintain a rotor in the second position, however, it is too weak when energized to displace the rotor from its first position.

It should be understood that the specific method and means herein illustrated and described are intended to be representative only, as certain changes may be made therein without departing from the clear teachings of this disclosure. Accordingly, reference should be made to the following appended claims in determining the full scope of the invention.

We claim:
1. A bistable magnetic indicating mechanism comprising
   (a) a cylindrical housing having a window at one end;
   (b) bearing means mounting a shaft for rotation in said housing;
   (c) a rotor having permanently magnetized poles mounted on said shaft;
   (d) first and second index means associated with said rotor;
   (e) first and second coils of predetermined differential electromagnetic strengths when energized in association with a magnetizable core element extending axially of said housing;
   (f) said rotor being urged into a first predetermined position by the permanent magnetic influence of its poles and said core in which position said first index means is visible through said window;
   (g) energization of said first coil creating a predetermined torque on said rotor of sufficient magnitude to rotate it from said first predetermined position into a second predetermined position in which said second index means is visible through said window;
   (h) energization of said second coil, alone, being insufficient to rotate said rotor from said first position to said second position but being sufficient to maintain said rotor in said second position;
   (i) whereby the interruption of the energization of said second coil causes said rotor when in its second position to return to said first predetermined position under said magnetic influence and whereby the subsequent re-energization of said second coil alone is insufficient by itself to return said rotor to said second position.

2. An indicator in accordance with claim 1, in which (a) said shaft is disposed transversely of said housing;
(b) said rotor is disposed adjacent said core element; and
(c) means are associated with said rotor to limit the travel thereof in opposite directions beyond said first and second positions.

3. An indicator in accordance with claim 2, in which
(a) said means for limiting the travel of said rotor comprises a non-magnetic clip element supported on said rotor;
(b) said clip element having a pair of outwardly extending arms disposed on opposite sides of said core;
(c) said clip element carrying said index means thereon.

4. An indicator in accordance with claim 3, in which
(a) the arms of said clip element are mutually spaced in relation to the diameter of said core element in a manner whereby one of said arms is immediately adjacent one side of said core element in the first position of the rotor and the other of said arms is immediately adjacent the opposite side of said core element when said rotor is in the second position.

5. An indicator in accordance with claim 2, in which
(a) said first coil includes a small number of turns;
(b) said second coil, in relation to said first coil, includes a comparatively large number of turns and is comprised of extremely fine gauge wire.

6. A bistable fault indicator comprising
(a) a permanently magnetized rotor which is self-biasing into a first position;
(b) a reset-test coil of predetermined strength and polarity when selectively energized to displace the rotor into a second position; and
(c) a monitoring coil, adapted to be continuously energized and when energized having a predetermined strength and polarity sufficient to maintain the rotor, previously displaced, in the second position but having insufficient strength to overcome the permanent magnetic bias and to displace said rotor from the first to the second position.

7. An indicator in accordance with claim 6, which includes
(a) a non-magnetic, index-bearing clip associated with the rotor for calibrating and limiting the travel of the same.

References Cited

UNITED STATES PATENTS

| | | | |
|---|---|---|---|
| 3,234,436 | 2/1966 | Bieger | 335—272 XR |
| 3,309,696 | 3/1967 | Alster et al. | 335—234 XR |
| 3,311,859 | 3/1967 | Bieger et al. | 335—230 |

FOREIGN PATENTS 1,109,748    9/1955    France.

GEORGE HARRIS, *Primary Examiner.*

U.S. Cl. X.R.

335—272; 340—373